United States Patent
Yamamura et al.

(10) Patent No.: US 10,888,822 B2
(45) Date of Patent: *Jan. 12, 2021

(54) SEPARATION MEMBRANE

(71) Applicant: TORAY INDUSTRIES, INC., Tokyo (JP)

(72) Inventors: Gohei Yamamura, Otsu (JP); Koichi Takada, Otsu (JP); Ryuichiro Hiranabe, Otsu (JP); Hiroki Tomioka, Otsu (JP)

(73) Assignee: Toray Industries, Inc., Tokyo (JP)

( * ) Notice: Subject to any disclaimer, the term of this patent is extended or adjusted under 35 U.S.C. 154(b) by 270 days.

This patent is subject to a terminal disclaimer.

(21) Appl. No.: 15/515,761

(22) PCT Filed: Sep. 30, 2015

(86) PCT No.: PCT/JP2015/077868
§ 371 (c)(1),
(2) Date: Mar. 30, 2017

(87) PCT Pub. No.: WO2016/052675
PCT Pub. Date: Apr. 7, 2016

(65) Prior Publication Data
US 2017/0296984 A1    Oct. 19, 2017

(30) Foreign Application Priority Data

Sep. 30, 2014 (JP) ................................. 2014-200263
Sep. 30, 2014 (JP) ................................. 2014-201250
Nov. 28, 2014 (JP) ................................. 2014-241229

(51) Int. Cl.
| | | |
|---|---|---|
| *B01D 71/18* | (2006.01) | |
| *C02F 1/44* | (2006.01) | |
| *B01D 61/00* | (2006.01) | |
| *B01D 61/02* | (2006.01) | |
| *B01D 69/08* | (2006.01) | |
| *B01D 71/52* | (2006.01) | |
| *C02F 103/08* | (2006.01) | |

(52) U.S. Cl.
CPC ............. *B01D 71/18* (2013.01); *B01D 61/00* (2013.01); *B01D 61/02* (2013.01); *B01D 69/08* (2013.01); *B01D 71/52* (2013.01); *C02F 1/44* (2013.01); *C02F 2103/08* (2013.01)

(58) Field of Classification Search
None
See application file for complete search history.

(56) References Cited

U.S. PATENT DOCUMENTS

| | | | | |
|---|---|---|---|---|
| 3,423,491 A * | 1/1969 | Mahon | ................. | B01D 67/003 200/230 |
| 3,585,126 A | 6/1971 | Cannon et al. | | |
| 4,781,833 A * | 11/1988 | Mizutani | ................. | B01D 63/02 210/321.81 |
| 5,611,930 A | 3/1997 | Nguyen et al. | | |
| 7,244,497 B2 * | 7/2007 | Hartmann | ................. | D01F 1/10 428/373 |
| 8,915,378 B2 | 12/2014 | Tokimi et al. | | |
| 2010/0155334 A1* | 6/2010 | Taniguchi | ............... | B01D 63/02 210/650 |
| 2011/0318982 A1 | 12/2011 | Funatsu et al. | | |
| 2013/0140236 A1* | 6/2013 | Tokimi | ................... | B01D 69/02 210/655 |

FOREIGN PATENT DOCUMENTS

| | | | | |
|---|---|---|---|---|
| CN | 102348841 A | 2/2012 | | |
| EP | 0592706 B1 | 2/1997 | | |
| EP | 3278867 A1 | 2/2018 | | |
| EP | 3290102 A1 | 3/2018 | | |
| GB | 2000722 B * | 1/1982 | ............... | D01D 5/24 |
| JP | 4414215 B1 | 6/1969 | | |
| JP | 5170316 A | 6/1976 | | |
| JP | 5822242 B1 | 5/1983 | | |
| JP | 03059105 A | 3/1991 | | |
| JP | 06277473 A | 10/1994 | | |
| JP | 359105 A * | 10/1998 | ............... | D01D 5/24 |
| JP | 2005273129 A * | 10/2005 | | |
| JP | 2005273129 A | 10/2005 | | |
| JP | 2008178814 A * | 8/2008 | | |
| JP | 2012115835 A | 6/2012 | | |

OTHER PUBLICATIONS

Maya J. John & Sabu Thomas, Natural Polymers, vol. 1: Composites 77 (2012). (Year: 2012).*
https://www.azom.conn/properties.aspx?ArticleID=1461, last visited Jan. 14, 2019 (Year: 2019).*
Extended European Search Report for European Application No. 15 846 410.7, dated Apr. 19, 2018, 8 pages.
International Search Report and Written Opinion for International Application No. PCT/JP2015/077868, dated Dec. 28, 2015, 6 Pages.
"Jikken Kagaku Kouza", Encyclopedia of Experimental Chemistry, 4th Edition, vol. 14, p. 485, edited by the Chemical Society of Japan, Maruzen Co., Ltd., 1992.
Chinese Office Action for Chinese Application No. 201580053063. 6, dated Feb. 25, 2020 with translation, 14 pages.
European Communication for European Application No. 15846410. 7, dated Feb. 18, 2020, 4 pages.
Chinese Office Action for Chinese Application No. 201580053063. 6, dated Jul. 25, 2019, with translation, 14 pages.
Notification of Reasons for Refusal for Japanese Application No. 2015-554385, dated Aug. 6. 2019, with translation, 7 pages.

* cited by examiner

*Primary Examiner* — Krishnan S Menon
*Assistant Examiner* — Brad Gordon
(74) *Attorney, Agent, or Firm* — RatnerPrestia

(57) ABSTRACT

The present invention provides a separation membrane having excellent separation performance and permeation performance, having high membrane strength, and mainly including a cellulose-based resin. The present invention relates to a separation membrane containing a cellulose ester and having a tensile elasticity of 1,500 to 6,500 MPa.

5 Claims, No Drawings

SEPARATION MEMBRANE

CROSS REFERENCE TO RELATED APPLICATIONS

This is the U.S. National Phase application of PCT/JP2015/077868, filed Sep. 30, 2015, which claims priority to Japanese Patent Application No. 2014-200263, filed Sep. 30, 2014, Japanese Patent Application No. 2014-201250, filed Sep. 30, 2014, and Japanese Patent Application No. 2014-241229, filed Nov. 28, 2014, the disclosures of each of these applications being incorporated herein by reference in their entireties for all purposes.

FIELD OF THE INVENTION

The present invention relates to a separation membrane having excellent separation performance and permeation performance, having high membrane strength and mainly including a cellulose-based resin.

BACKGROUND OF THE INVENTION

Cellulose-based resins have been widely used as separation membranes including water treatment membranes, because they have permeation performance due to their hydrophilicity and have chlorine resistance performance of being strong against chlorine bactericides.

For example, Patent Document 1 discloses a hollow fiber membrane obtained by melt-spinning a mixture obtained by mixing a water-soluble polyhydric alcohol having an average molecular weight of 200 to 1,000 with cellulose diacetate.

Further, Patent Document 2 discloses a hollow fiber membrane obtained by discharging from an arc-shaped nozzle a solution obtained by mixing N-methyl-2-pyrrolidone, ethylene glycol and benzoic acid with cellulose triacetate, and immersing it in a coagulating bath including N-methyl-2-pyrrolidone/ethylene glycol/water, followed by water washing and heat treatment.

PATENT DOCUMENT

Patent Document 1: JP-A-51-70316
Patent Document 2: JP-A-2012-115835

SUMMARY OF THE INVENTION

The hollow fiber membrane obtained by the technique described in Patent Document 1 described above shows high permeation performance, but only realizes low separation performance. In addition, there is a problem in production that spinning cannot be performed at a high draft, because yarn breakage is likely to occur during the melt spinning, which causes insufficient membrane strength of the resulting hollow fiber membrane.

The hollow fiber membrane obtained by the technique of Patent Document 2 has excellent separation performance and permeation performance, but has low membrane strength.

In view of such a background of the conventional techniques, an object of the present invention is to provide a separation membrane having excellent separation performance and permeation performance, having high membrane strength, and mainly including a cellulose-based resin.

The present invention includes providing a separation membrane containing a cellulose ester and having a tensile elasticity of 1,500 to 6,500 MPa.

As the separation membrane of the present invention, there is provided a separation membrane having excellent separation performance and permeation performance, having high membrane strength and mainly including a cellulose-based resin. The separation membrane of the present invention can be preferably used for uses requiring the separation performance and permeation performance, and the high membrane strength. Specifically, it can be used for water treatment membranes for producing industrial water, drinking water and the like from seawater, brackish water, sewage water, waste water and the like, medical membranes for artificial kidneys, plasma separation and the like, membranes for food-beverage industry such as fruit juice concentration, gas separation membranes for separating exhaust gas, carbonic acid gas and the like, membranes for electronic industry such as fuel cell separators, and the like. The above-mentioned water treatment membrane can be preferably used for microfiltration membranes, ultrafiltration membranes, nanofiltration membranes, reverse osmosis membranes, forward osmosis membranes and the like.

DETAILED DESCRIPTION OF EMBODIMENTS OF THE INVENTION (1) Separation Membrane

The separation membrane of the present invention may contain a liquid such as water therein in order to retain its shape. However, in the following description, such a liquid for retaining the shape is not considered as a constituent element of a hollow fiber membrane.

(1-1) Cellulose Ester (A)

The separation membrane of an embodiment of the present invention contains a cellulose ester (A). Specific examples of the cellulose esters (A) include cellulose acetate, cellulose propionate, cellulose butyrate, and a cellulose-mixed ester in which 3 hydroxyl groups present in a glucose unit of cellulose are blocked with 2 or more types of acyl groups.

Specific examples of the cellulose-mixed esters include, for example, cellulose acetate propionate, cellulose acetate butyrate, cellulose acetate laurate, cellulose acetate oleate, and cellulose acetate stearate.

Each cellulose-mixed ester exemplified has acetyl groups and other acyl groups (for example, propionyl groups, butyryl groups, lauryl groups, oleyl groups, stearyl groups or the like). It is preferred that the average degrees of substitution of acetyl groups and other acyl groups in the cellulose-mixed ester satisfy the following formulae. The term "average degrees of substitution" refers to the numbers of hydroxyl groups to which acetyl groups and other acyl groups, respectively, are chemically bonded, among 3 hydroxyl groups present per a glucose unit of the cellulose.

$$1.0 \leq (\text{average degree of substitution of acetyl groups} + \text{average degree of substitution of other acyl groups}) \leq 3.0$$

$$0.1 \leq (\text{average degree of substitution of acetyl groups}) \leq 2.6$$

$$0.1 \leq (\text{average degree of substitution of other acyl groups}) \leq 2.6$$

When the above-mentioned formulae are satisfied, the membrane achieving both the separation performance and the permeation performance is realized. Further, when the above-mentioned formulae are satisfied, good thermal flowability of a membrane forming raw material is realized during melt spinning, in the production of the separation membrane.

The separation membrane of the present invention may contain either only one type of the cellulose esters (A) or two or more types thereof.

Furthermore, in the separation membrane of the present invention, it is preferred to contain particularly at least one of cellulose acetate propionate and cellulose acetate butyrate, among the cellulose esters (A) described above as the specific examples. The separation membrane having high separation performance and high permeation performance is realized by containing these cellulose esters.

The weight average molecular weight (Mw) of the cellulose ester (A) is preferably from 50,000 to 250,000. When Mw is 50,000 or more, thermal decomposition of the cellulose ester (A) during melt spinning is suppressed, and the membrane strength of the separation membrane can reach a practical level. When Mw is 250,000 or less, the melt viscosity does not become excessively high and therefore stable melt spinning becomes possible. Mw is more preferably from 60,000 to 220,000, and still more preferably from 80,000 to 200,000. The weight average molecular weight (Mw) is a value calculated by GPC measurement. A calculation method thereof is described in detail in Examples.

In particular, the separation membrane of the present invention preferably contains the cellulose ester (A) as a main component. The term "contains as a main component" refers to that the content of the cellulose ester (A) is 70% by weight or more, 80% by weight or more, or 90% by weight or more.

(1-2) Plasticizer (B)

The separation membrane of the present invention may contain a plasticizer (B). The plasticizer (B) may remain in the separation membrane or may be eluted from the separation membrane into water after the cellulose ester has been plasticized during melt spinning. When the plasticizer (B) is eluted into water, traces formed by elution of the plasticizer become fine pores in the membrane to improve the permeation performance.

The plasticizer (B) is not particularly limited, as long as it is a compound which thermoplasticizes the cellulose ester (A). Further, not only one type of the plasticizer but also two or more types of the plasticizers may be used in combination.

As the plasticizer (B), preferred is a polyhydric alcohol-based compound. Specific examples thereof include polyalkylene glycols, glycerin-based compounds, and caprolactone-based compounds. Of these, the polyalkylene glycols have good compatibility with the cellulose esters, and exhibit thermoplasticity even when added in small amounts. The polyalkylene glycols are therefore preferred, in terms of suppressing a decrease in the membrane strength due to the plasticizers and the fact that the pores formed after elution becomes fine to make it possible to achieve both the separation performance and the permeation performance.

Specific examples of the polyalkylene glycols include polyethylene glycol, polypropylene glycol, polybutylene glycol and the like, which have a weight average molecular weight of 400 to 2,000.

Specific examples of the glycerin-based compounds include, for example, glycerin, glycerin fatty acid esters such as glycerin diacetomonostearate, glycerin diacetomonolaurate and glycerin diacetomonooleate, diglycerin, and diglycerin fatty acid esters.

Further, the content of the plasticizer (B) during melt spinning is preferably from 5 to 26% by weight. When the content of the plasticizer (B) is 5% by weight or more, the thermoplasticity of the cellulose ester (A) and the permeation performance of the separation membrane are improved. When the content of the plasticizer (B) is 26% by weight or less, the separation performance and membrane strength of the separation membrane are improved. The content of the plasticizer (B) is more preferably from 10 to 24% by weight, and still more preferably from 14 to 22% by weight.

(1-3) High-Molecular-Weight Polyalkylene Glycol (C)

The separation membrane of an embodiment of the present invention preferably contains a high-molecular-weight polyalkylene glycol (C) having a number average molecular weight (Mn) of 2,000 to 1,000,000 (hereinafter simply referred to as a high-molecular-weight polyalkylene glycol). The high-molecular-weight polyalkylene glycol (C) in the present invention may remain in the separation membrane or may be eluted from the separation membrane into water, after membrane formation.

In a part in which the high-molecular-weight polyalkylene glycol (C) remains in the separation membrane, intermolecular spaces of the high-molecular-weight polyalkylene glycol (C) and the cellulose ester (A) form flow channels, which is preferred in terms of improving the permeability. In a part from which the high-molecular-weight polyalkylene glycol (C) is eluted, traces formed by elution of the high-molecular-weight polyalkylene glycol (C) become fine pores in the membrane, which is preferred in terms of improving the permeability.

Specific examples of the high-molecular-weight polyalkylene glycols (C) include, for example, polyethylene glycol, polypropylene glycol, polybutylene glycol and the like, which have a Mn of 2,000 to 1,000,000.

When the Mn is 1,000,000 or less, the dispersibility in the cellulose ester is improved to form a homogeneous composition, and therefore, the membrane-forming property is improved. The Mn is more preferably 500,000 or less, still more preferably 300,000 or less, yet still more preferably 100,000 or less, and particularly preferably 20,000 or less. When the Mn is 2,000 or more, the continuous flow channels and/or the fine pores become to be easily formed, and the good permeability can be obtained. The Mn is more preferably 6,000 or more, and still more preferably 8,000 or more.

In addition, the content of the high-molecular-weight polyalkylene glycol (C) to the whole composition constituting the separation membrane is preferably from 0.01 to 10% by weight. When the content of the high-molecular-weight polyalkylene glycol (C) is 0.01% by weight or more, the permeation performance of the separation membrane is improved. When the content of the high-molecular-weight polyalkylene glycol (C) is 10% by weight or less, the separation performance and the membrane strength of the separation membrane are improved. The content of the high-molecular-weight polyalkylene glycol (C) is more preferably from 0.05 to 8.0% by weight, and still more preferably from 0.1 to 6.0% by weight.

(1-4) Antioxidant (D)

The separation membrane of the present invention preferably contains an antioxidant (D), particularly a phosphorus antioxidant. In particular, a pentaerythritol-based compound is preferred. Specifically, examples of the pentaerythritol-based compounds include bis(2,6-di-t-butyl-4-methylphenyl)pentaerythritol diphosphite. When the phosphorus antioxidant is contained, thermal decomposition during melt spinning is suppressed. As a result, it becomes possible to improve the membrane strength and to prevent the membrane from being colored. The content of the antioxidant (D) is preferably from 0.005 to 0.500% by weight based on the composition to be subjected to melt spinning.

(1-5) Hydrophilic Polymer

The separation membrane of the present invention preferably contains a hydrophilic polymer. When the hydrophilic polymer is contained, particularly in the case of use as a water treatment membrane, it becomes possible to improve the permeation performance. The term "hydrophilic polymer" as used herein means a polymer having high affinity with water, and refers to a polymer which is soluble in water or has a smaller contact angle with water than that of the cellulose ester used in the separation membrane. The hydrophilic polymer is not particularly limited, as long as it has the above-mentioned property. Preferred examples thereof include polyalkylene glycols, and polyvinyl alcohol.

(1-6) Membrane Shape

Although the shape of the separation membrane of the present invention is not particularly limited, a membrane having a hollow fiber shape (hereinafter also referred to as a hollow fiber membrane) or a membrane having a planner shape (hereinafter also referred to as a flat membrane) is preferably employed. Of these, the hollow fiber membrane is more preferred because it is possible to be efficiently filled in a module, thereby being able to enlarge an effective membrane area per unit volume of the module. The hollow fiber membrane is a fibrous membrane having a hollow.

The thickness of the separation membrane is preferably from 2 to 50 μm, more preferably from 3 to 40 μm, and still more preferably from 4 to 30 μm, from the viewpoint of improving the permeation performance.

In the case of the hollow fiber membrane, the outer diameter of the hollow fiber is preferably 20 μm or more, more preferably 40 μm or more, still more preferably 100 μm or more, and particularly preferably 110 μm or more, from the viewpoint of achieving both the effective membrane area at the time when filled in the module and the membrane strength. In addition, the outer diameter of the hollow fiber is preferably 200 μm or less, more preferably 180 μm or less, and particularly preferably 160 μm or less.

Further, in the case of the hollow fiber membrane, the percentage of hollowness of the hollow fiber is preferably from 20 to 55%, more preferably from 25 to 50%, and still more preferably from 30 to 45%, from the relationship between the pressure loss of a fluid flowing through a hollow part and the buckling pressure.

A method for adjusting the outer diameter or the percentage of hollowness of the hollow fiber in the hollow fiber membrane to fall in the above-mentioned range is not particularly limited. For example, the adjustment can be made by appropriately changing the shape of a discharge hole of a spinneret for producing the hollow fiber or the draft ratio which can be calculated by winding rate/discharge rate.

(1-7) Structure of Cross-Section

The separation membrane of the present invention is preferably homogeneous in structure of a cross-section in a thickness direction of the membrane. The term "a cross-section in a thickness direction of the membrane" as used herein refers to a cross-section in a direction perpendicular to a machine direction (lengthwise direction) during production (in a width direction) and in a thickness direction of the membrane, in the case of the flat membrane, and refers to a cross-section in a direction perpendicular to a machine direction (lengthwise direction) during production (in a fiber diameter direction) and in a thickness direction of the membrane, in the case of the hollow fiber membrane. In the case of press membrane formation and the like having no clear machine direction during production, it refers to a cross-section in a thickness direction at any place of the membrane.

Further, the term "homogeneous in structure of a cross-section" as used herein refers to a state in which no change in structure is observed, when the cross-section in the above-mentioned thickness direction of the membrane is continuously observed in the thickness direction from one surface side of the membrane to the other surface side under a scanning electron microscope having a magnification of 1,000 times. Here, strains in structure of the cross-section and the like exerting an influence on the surface shape of the membrane are not regarded as changes in structure.

For example, a flat membrane or a hollow fiber membrane obtained by discharging a solvent-free resin composition melted by heating from a slit-shaped spinneret and thereafter performing cooling and solidification, a membrane obtained by casting a solution in which a resin composition is dissolved in a solvent on a glass plate or the like and thereafter evaporating all the solvent, furthermore, a membrane obtained by discharging a solution in which a resin composition is dissolved in a solvent from a slit-shaped spinneret, thereafter evenly solidifying it in a thickness direction and evenly extracting the solvent in the solution in the thickness direction, and the like are a membrane homogeneous in structure of the cross-section, because the above-mentioned changes in structure are not confirmed.

On the other hand, when a solution in which a resin composition is dissolved in a solvent is discharged from a slit-shaped spinneret and thereafter unevenly solidified in a thickness direction, for example, when both or one surface is rapidly solidified and an inside is slowly solidified, extraction of the solvent in the solution becomes uneven in the thickness direction. Therefore, the above-mentioned changes in structure are confirmed, and a membrane non-homogeneous in structure of the cross-section is formed. A membrane generally called an asymmetric membrane, which has a dense separation functional layer partially in a thickness direction of the membrane by a non-solvent phase separation method, a heat-induced phase separation method or the like, is a membrane non-homogeneous in structure of the cross-section.

(1-8) Physical Properties of Separation Membrane

Physical properties of the separation membrane of the present invention are described below.

(1-8-1) Crystal Melting Heat Amount

The separation membrane of the present invention preferably has a crystal melting heat amount ($\Delta Hm$) of 4 to 20 J/g in temperature rise measurement with a differential scanning calorimeter (DSC). Measurement conditions of DSC are described in detail in Examples. When $\Delta Hm$ is from 4 to 20 J/g, the separation performance and the membrane strength are more improved.

Methods for adjusting $\Delta Hm$ to 4 to 20 J/g include, but are not particularly limited to, a method of setting temperature conditions of spinning temperature during melt spinning, the distance from a lower surface of a spinneret to an upper end of a cooling apparatus (chimney), conditions of cooling air of a cooling apparatus and the draft ratio and/or drawing-heat setting conditions to respective preferred conditions described later. $\Delta Hm$ is more preferably 6 J/g or more, and still more preferably 8 J/g or more. In addition, $\Delta Hm$ is more preferably 15 J/g or less, and still more preferably 10 J/g or less.

(1-8-2) Membrane Permeation Flux

The separation membrane of the present invention preferably has a membrane permeation flux of 0.5 L/m²/day or more, in order to exhibit good permeation performance, particularly when used as a water treatment membrane. Measurement conditions of the membrane permeation flux are described in detail in Examples. The membrane permeation flux is more preferably 1.0 L/m²/day or more, still more preferably 1.5 L/m²/day or more, yet still more preferably 2.0 L/m²/day or more, and particularly preferably 3.0 L/m²/day or more. The higher membrane permeation flux is preferred. However, the upper limit thereof is 300 L/m²/day from a balance with the salt rejection.

(1-8-3) Salt Rejection

The separation membrane of the present invention preferably has a salt rejection of 50.0 to 99.5%, in order to exhibit good separation performance, particularly when used as a water treatment membrane. Measurement conditions of the salt rejection are described in detail in Examples. The salt rejection is more preferably from 90.0 to 99.5%, still more preferably from 93.0 to 99.5%, and particularly preferably from 96.0 to 99.5%.

(1-8-4) Tensile Elasticity

The separation membrane of an embodiment of the present invention has a tensile elasticity of 1,500 to 6,500 MPa. In particular, it is preferred that the tensile elasticity in a lengthwise direction of the separation membrane falls within this range. The term "lengthwise direction" as used herein refers to a machine direction during production. Measurement conditions of the tensile elasticity are described in detail in Examples.

When the tensile elasticity in the lengthwise direction is 1,500 MPa or more, suitable strength is obtained. Also, when the tensile elasticity in the lengthwise direction is 6,500 MPa or less, flexibility suitable for incorporating the separation membrane into a membrane module is realized.

Methods for adjusting the tensile elasticity to 1,500 to 6,500 MPa include, but are not particularly limited to, a method of using the cellulose ester having the preferred weight average molecular weight described above and setting the draft ratio and/or drawing-heat setting conditions to respective preferred conditions described later. The tensile elasticity is preferably 1,800 MPa or more, more preferably 2,000 MPa or more, and still more preferably 2,200 MPa or more. Also, the tensile elasticity is preferably 6,000 MPa or less, more preferably 5,000 MPa or less, still more preferably 4,000 MPa or less, and particularly preferably 3,000 MPa or less.

(1-8-5) Tensile Strength

The separation membrane of the present invention preferably has a tensile strength of 80 MPa or more, in order to exhibit the membrane strength. Measurement conditions of the tensile strength are described in detail in Examples. The tensile strength is more preferably 100 MPa or more, and still more preferably 120 MPa or more. The higher tensile strength is preferred. However, the practical upper limit thereof is 300 MPa.

(1-8-6) Degree of Orientation

The separation membrane of the present invention preferably has a degree of orientation of 1.05 to 2.50 in a lengthwise direction. The term "lengthwise direction" as used herein refers to a machine direction during production. When the degree of orientation is 1.05 or more, both high permeability and separability can be achieved.

When the degree of orientation is increased, the intermolecular chain spaces of the cellulose ester become even. It is therefore considered that hydrogen bonding sites are dispersed at even intervals to promote adsorption and permeation of water and to prevent an entry of a material to be separated, such as salt. Accordingly, when the degree of orientation is 1.15 or more, 1.30 or more, 1.50 or more, and 1.70 or more, the higher effect can be obtained.

On the other hand, when the degree of orientation is 2.50 or less, yarn breakage during membrane formation is suppressed, so that a decrease in productivity is suppressed and good permeability is obtained.

Also, in order to increase the permeability, the degree of orientation is preferably less than 2.30, less than 2.20, less than 2.00, and further less than 1.80.

The degree of orientation is measured with FT-IR. A specific measurement method thereof is described in Examples.

(1-8-7) Positron Annihilation Life

In the separation membrane of the present invention, the positron annihilation life obtained by a positron annihilation life measurement method is preferably from 2.2 ns to 3.0 ns, more preferably 2.25 ns or more and less than 2.8 ns, and still more preferably 2.3 ns or more and less than 2.5 ns.

When the positron annihilation life is short, a membrane having a small water permeation amount and a high desalination ratio is obtained. On the contrary, when the positron annihilation life is long, a membrane having a large water permeation amount and a low desalination ratio is obtained. However, according to studies of the present inventors, it has been found that a membrane having a high desalination ratio is obtained by adjusting the degree of orientation so as to fall in a specified range, even when the membrane has the same positron annihilation life as that of a conventionally known membrane. That is, it has been found that when a membrane having a large water permeation amount and a low desalination ratio, which shows a large positron annihilation life, has a specified degree of orientation, a separation membrane which is high in both the water permeation amount and the desalination ratio is realized.

The term "positron annihilation life measurement method" as used herein refers to a method for measuring the time (in the order of hundreds of picoseconds to tens of nanoseconds) from incidence of positrons on a sample to annihilation thereof and non-destructively evaluating information such as the size of holes of 0.1 to 10 nm, the number density thereof and the size distribution thereof, based on the annihilation life. Details of such a measurement method are described, for example, in "Jikken Kagaku Kouza (Encyclopedia of Experimental Chemistry) 4th Ed.", vol. 14, page 485, edited by the Chemical Society of Japan, Maruzen Co., Ltd. (1992).

Specifically, this method is a positron beam method of using a positron beam emitted from an electron beam accelerator as a positron beam source, and useful for hole evaluation to thin membranes with a thickness of about hundreds of nanometers formed on various substrates.

The measurement method is more specifically described in Examples.

(1-9) Additive

The separation membrane of the present invention may contain an additive other than the additives described above, within a range not impairing the effect of the present invention. Examples thereof include an organic lubricant, a crystal nucleating agent, organic particles, inorganic particles, a terminal blocking agent, a chain extender, an ultraviolet absorber, an infrared absorber, a coloration preventing agent, a delustering agent, an antimicrobial agent, an electrification suppressing agent, a deodorant, a flame retardant, a weather-resistant agent, an antistatic agent, an antioxidant, an ion-exchanging agent, an antifoaming agent, a color pigment, a fluorescent whitening agent, and a dye.

(2) Type of Membrane

The separation membrane of the present invention is a membrane particularly usable for water treatment. Specifically, examples of the water treatment membrane include microfiltration membranes, ultrafiltration membranes, nanofiltration membranes, reverse osmosis membranes, and forward osmosis membranes. The separation membrane of the present invention is preferably applied particularly to the nanofiltration membranes, the reverse osmosis membranes and the forward osmosis membranes.

(3) Production Method

A method for producing the separation membrane of the present invention is specifically described below, taking as an example the case where the separation membrane is a hollow fiber membrane, but should not be construed as being limited thereto.

The example of the method for producing the separation membrane of the present invention includes three steps: a step of preparing a resin composition (pellets); a step of preparing a hollow fiber; and a step of preparing a hollow fiber membrane.

(3-1) Preparation of Resin Composition (Pellets)

A cellulose ester and another material, for example, 50 to 95% by weight of a cellulose ester and 5 to 50% by weight of a polyalkylene glycol, are introduced into a twin-screw kneading extruder, and melted by heating. An introducing method may be any method, such as a method of introducing a mixture obtained by previous mixing or a method of performing introduction using a plurality of feeders in which discharge amounts are each set. Melt kneading is performed until evenly mixed, and thereafter the resulting melt is discharged in a water tank in a gut form, followed by cutting with a pelletizer to obtain pellets.

(3-2) Preparation of Hollow Fiber

Then, the resulting pellets are formed into a hollow fiber by a melt spinning method. Specifically, it includes:

(a) a step of melting the pellets by heating and feeding a melt to a spinning pack;

(b) a step of discharging the melt from a spinneret;

(c) a step of obtaining the hollow fiber by cooling the resin composition discharged; and (d) a step of winding the hollow fiber.

The spinning temperature (the temperature of the spinning pack) is preferably from (Tm+5° C.) to (Tm+25° C.), when the crystal melting temperature of the resin composition in temperature rise measurement with a differential scanning calorimeter (DSC) is defined as Tm. Measurement conditions of DSC are described in detail in Examples. The spinning temperature is more preferably from (Tm+5° C.) to (Tm+20° C.), still more preferably from (Tm+5° C.) to (Tm+15° C.), and particularly preferably from (Tm+5° C.) to (Tm+10° C.). In the present invention, it has been found that the separation performance of the separation membrane is more improved and that the membrane strength is more increased, particularly by suppressing the spinning temperature lower than usual.

In this method, various spinnerets for producing the hollow fiber can be used. Specifically, the hollow fiber can be produced using a spinneret of a C-shaped slit, a spinneret having one discharge hole formed by arranging a plurality of (2 to 5) arcuate (arc-shaped) slit parts, a tube-in orifice type spinneret or the like.

The pellets incited are discharged downwards from the discharge hole of the spinneret which is assembled in a lower part of the spinning pack. Here, the distance from the lower surface of the spinneret to the upper end of the cooling apparatus (chimney) is preferably from 0 to 50 mm, more preferably from 0 to 40 mm, and still more preferably from 0 to 30 mm.

When the hollow fiber discharged from the spinneret is cooled, the temperature of the cooling air of the cooling apparatus (chimney) is preferably from 5 to 25° C. In addition, the air velocity of the cooling air is preferably from 0.8 to 2.0 m/sec, more preferably from 1.1 to 2.0 m/sec, and still more preferably from 1.4 to 2.0 m/sec.

The hollow fiber cooled with the cooling apparatus is wound by a winder. The draft ratio which can be calculated by winding rate/discharge rate is preferably from 200 to 1,000, more preferably from 300 to 900, and still more preferably from 400 to 800.

This method may be further provided with a step of drawing the hollow fiber after spinning. A drawing method is not particularly limited. For example, the hollow fiber before drawing is transferred on a heat roll, whereby the temperature thereof is elevated to a temperature at which drawing is performed, and drawing is performed in a single stage or in multiple stages of two or more stages, utilizing the difference in peripheral speed between heat rolls.

The range of the temperature of the hollow fiber in the drawing step is preferably from 60 to 140° C., more preferably from 70 to 130° C., and still more preferably from 80 to 120° C. The total draw ratio is preferably from 1.05 to 1.50, more preferably from 1.10 to 1.45, and still more preferably from 1.15 to 1.40. Further, heat setting may be performed during or after drawing as needed. The heat setting temperature is preferably from 100 to 220° C.

(3-3) Preparation of Hollow Fiber Membrane

A hollow fiber membrane is obtained by a step of eluting the polyalkylene glycol from the hollow fiber thus obtained.

The polyalkylene glycol is eluted by only immersion in water and/or alcohol to perform this step. Water is preferred since it is low in cost, and alcohol is preferred in terms of hydrophilizing a surface of the membrane. Also, when the membrane is dried, the intermolecular spaces vary. It is therefore preferred to keep the membrane in a state having alcohol, water or the like.

(4) Module

The separation membranes of the present invention obtained as described above are filled in a case by a conventionally known method, thereby being able to prepare a module. For example, a hollow fiber membrane module includes the plurality of hollow fiber membranes and a cylindrical case. The plurality of hollow fiber membranes are bundled and inserted into the cylindrical case, and thereafter, ends thereof are fixed to the above-mentioned case with a thermosetting resin such as polyurethane or an epoxy resin and sealed. The ends of the hollow fiber membranes, which are cured with the thermosetting resin, are cut, thereby obtaining opening surfaces of the hollow fiber membranes to prepare the module.

(5) Water Production Method

The separation membranes of the present invention are processed to the configuration of the above-mentioned module, and thereafter, can be used in water production for the purpose of removing a solute from a solution. The operation pressure in that case is preferably 0.1 MPa or more, more preferably 0.3 MPa or more, and still more preferably 0.6 MPa or more. In general, the larger the operation pressure is, the more the membrane permeation flux and the desalination ratio are both increased.

On the other hand, in order to suppress breakage of the membrane such as a radial crush of the hollow fiber membrane, the operation pressure is preferably 6.0 MPa or less, more preferably less than 3.0 MPa, and still more preferably less than 1.5 MPa.

When the separation membrane of the present invention is used in desalination of a liquid, the temperature of the liquid to be fed is preferably 45° C. or lower, more preferably lower than 40° C., and still more preferably lower than 35° C., in order to realize a high desalination ratio. On the other hand, in order to obtain a high membrane permeation flux, the temperature of the liquid to be fed is preferably 5° C. or higher, and more preferably 10° C. or higher.

Further, when the pH of the liquid to be fed is high, scale of magnesium or the like may be formed in the case where the liquid to be fed is feed water having a high salt concentration such as seawater, and there may be a risk of membrane degradation owing to high pH operation. Therefore, operation in a neutral range is preferred.

The upper limits and lower limits of the numerical value ranges described above may be arbitrarily combined.

EXAMPLES

The present invention is more specifically described below showing Examples. However, the present invention should not be construed as being restricted thereby in any way.

[Measurement and Evaluation Methods]

The respective characteristic values in Examples were determined by the following methods.

In the following (3) to (8) and (11) to (13), measurement and evaluation were performed in a state where each separation membrane was dried in vacuum at 25° C. for 8 hours.

(1) Average Degrees of Substitution for Cellulose-Mixed Ester

A method for calculating the average degrees of substitution for a cellulose-mixed ester in which acetyl groups and acyl groups are bonded to cellulose is as follows.

A cellulose-mixed ester (0.9 g) dried at 80° C. for 8 hours was weighed, and dissolved by adding 35 ml of acetone and 15 ml of dimethyl sulfoxide. Thereafter, 50 ml of acetone was further added thereto. With stirring, 30 ml of a 0.5 N aqueous solution of sodium hydroxide was added, followed by saponification for 2 hours. Then, 50 ml of hot water was added, and a side surface of a flask was washed. Thereafter, titration was performed with 0.5 N sulfuric acid using phenolphthalein as an indicator. Separately, a blank test was performed by the same method as for the sample. After the completion of the titration, a supernatant of the solution was diluted to 100 times, and the compositions of organic acids were measured using an ion chromatograph. From the measurement results and the results of acid composition analysis with the ion chromatograph, the degrees of substitution were calculated by the following formulae.

$$TA=(B-A) \times F/(1000 \times W)$$

$$DSace=(162.14 \times TA)/[\{1-(Mwace-(16.00+1.01)) \times TA\}+\{1-(Mwacy-(16.00+1.01)) \times TA\} \times (Acy/Ace)]$$

$$DSacy=DSace \times (Acy/Ace)$$

TA: Total organic acid amount (ml)
A: Sample titration amount (ml)
B: Blank test titration amount (ml)
F: Titer of sulfuric acid
W: Sample weight (g)
DSace: Average degree of substitution of acetyl groups
DSacy: Average degree of substitution of acyl groups
Mwace: Molecular weight of acetic acid
Mwacy: Molecular weight of another organic acid
Acy/Ace: Molar ratio of acetic acid (Ace) and another organic acid (Acy)
162.14: Molecular weight of a repeating unit of cellulose
16.00: Atomic weight of oxygen
1.01: Atomic weight of hydrogen (2) Weight Average Molecular Weight (Mw) of Cellulose Ester A cellulose ester was completely dissolved in tetrahydrofuran to a concentration of 0.15% by weight to prepare a sample for GPC measurement. Using this sample, GPC measurement was performed with Waters 2690 under the following conditions to determine the weight average molecular weight (Mw) in terms of polystyrene.

Column: Two TSK gel GMHHR-H columns (manufactured by Tosoh Corp.) were connected to each other.
Detector: Waters 2410, differential refractometer R1
Solvent for mobile phase: Tetrahydrofuran
Flow rate: 1.0 ml/min
Injection amount: 200 µl (3) Thickness (µm) of Membrane A cross-section in a direction perpendicular to a lengthwise direction of a membrane (in a width direction) and in a thickness direction of the membrane was observed and photographed by an optical microscope, and the thickness (µm) of the membrane was calculated. The thickness of the membrane was observed and calculated at arbitrary 10 positions, and the average value thereof was obtained.

(4) Outer Diameter (µm) of Hollow Fiber

A cross-section in a direction perpendicular to a lengthwise direction of a hollow fiber (in a fiber diameter direction) and in a thickness direction of the membrane was observed and photographed by an optical microscope, and the outer diameter (µm) of the hollow fiber was calculated. The outer diameter of the hollow fiber was calculated using 10 hollow fibers, and the average value thereof was obtained.

(5) Percentage of Hollowness of Hollow Fiber

A cross-section in a direction perpendicular to a lengthwise direction of a hollow fiber (in a fiber diameter direction) and in a thickness direction of the membrane was observed and photographed by an optical microscope, and the total area Sa including a hollow part in the cross-section and the area Sb of the hollow part were measured. The percentage of hollowness was calculated using the following formula. The percentage of hollowness was calculated using 10 hollow fibers, and the average value thereof was obtained.

Percentage of hollowness (%)=$(Sb/Sa) \times 100$ (6) Tensile Elasticity (MPa)

The tensile elasticity was measured in an environment of a temperature of 20° C. and a humidity of 65%, using a tensile tester (Tensilon UCT-100 manufactured by Orientec Co., Ltd.). Specifically, measurement was performed under conditions of a sample length of 100 mm and a tension rate of 100 mm/min, and for the other conditions, according to the method defined in "JIS L 1013: 2010, Testing methods for man-made filament yarns, 8.10 Initial tensile resistance". The apparent Young's modulus calculated from the initial tensile resistance was taken as the tensile elasticity (MPa). The measurement was repeated 5 times, and the average value thereof was obtained.

(7) Crystal Melting Heat Amount (ΔHm) (J/g) of Separation Membrane

Using a differential scanning calorimeter DSC-6200 manufactured by Seiko Instruments Inc., about 5 mg of a separation membrane sample dried in vacuum at 25° C. for 8 hours was set in an aluminum tray, increased in temperature from −50° C. to 350° C. at a temperature rising rate of 20° C./min, and thereafter held in a molten state for 5 minutes while keeping 350° C. Based on a crystal melting peak observed at this time, the crystal melting heat amount was determined according to the method defined in JIS K 7121 (1987). An endothermic peak present in a range of 120° C. or lower is not included in the crystal melting heat amount, because it is considered to be due to dehydration. Further, when a plurality of crystal melting peaks appeared, the crystal melting heat amount was determined by totaling all crystal melting heat amounts.

(8) Crystal Melting Temperature (° C.) of Resin Composition for Melt Spinning

Using a differential scanning calorimeter DSC-6200 manufactured by Seiko Instruments Inc., about 5 mg of a resin composition sample dried in vacuum at 25° C. for 8 hours was set in an aluminum tray, increased in temperature from −50° C. to 350° C. at a temperature rising rate of 20° C./min, and thereafter held in a molten state for 5 minutes while keeping 350° C. A crystal melting peak observed at this time was taken as the crystal melting temperature (° C.). When a plurality of crystal melting peaks appeared, the crystal melting peak which appeared on the highest temperature side was employed.

(9) Permeation Performance (Membrane Permeation Flux (L/m²/day))

An aqueous solution of sodium chloride adjusted to a concentration of 500 ppm, a temperature of 25° C. and a pH of 6.5 was fed at an operation pressure of 0.75 MPa to a separation membrane hydrophilized by immersion in a 10 wt % aqueous solution of isopropyl alcohol for 1 hour, thereby performing membrane filtration treatment. Based on the amount of the resultant permeate, the membrane permeation flux was determined by the following formula:

Membrane permeation flux (L/m²/day)=amount of permeate per day/membrane area

(10) Separation Performance (Salt Rejection (%))

The membrane filtration treatment was performed under the same conditions as in the case of the membrane permeation flux, and the salt concentration of the resultant permeate was measured. From the salt concentration of the resultant permeate and the salt concentration of feed water, the salt rejection was determined based on the following formula. The salt concentration of permeate was determined from the measured value of the electroconductivity.

Salt rejection (%)=100×{1−(sodium chloride concentration in permeate/sodium chloride concentration in feed water)}

When the separation membrane was the hollow fiber membrane in the above-mentioned (9) and (10), a small-sized module was produced as described below, and the membrane filtration treatment was performed.

The hollow fiber membranes were bundled and inserted into a plastic pipe, and thereafter, gaps between the membranes and gaps between the membranes and the pipe were sealed by curing a thermosetting resin at ends of the bundled hollow fiber membranes. Opening surfaces of the hollow fiber membranes were obtained by cutting the ends of the sealed hollow fiber membranes to prepare the small-sized module for evaluation having a membrane area on an outer diameter basis of about 0.1 m².

(11) Membrane Strength (Tensile Strength (MPa))

The membrane strength was measured in an environment of a temperature of 20° C. and a humidity of 65%, using a tensile tester (Tensilon UCT-100 manufactured by Orientec Co., Ltd.). Specifically, measurement was performed under conditions of a sample length of 100 mm and a tension rate of 100 mm/min and for the other conditions, according to the method defined in "JIS L 1013: 2010, Testing methods for man-made filament yarns, 8.5 Tensile stress and elongation percentage", and the tensile strength (breaking strength) (MPa) was calculated from the tensile stress. The measurement was repeated 5 times, and the average value thereof was obtained.

(12) Degree of Orientation

Using FT-IR (FTS-55A) manufactured by BioRad DIGI-LAB Inc., which was equipped with a single reflection ATR accessory, and using a separation membrane sample dried in vacuum at 25° C. for 8 hours, S polarization spectra were measured in a lengthwise direction and in a direction perpendicular to the lengthwise direction (in a width direction or a radial direction). A Ge prism was used as an ATR crystal, the incident angle was 45°, and the integrated number of times was 256. A wire grid was used as a polarizer, and the measurement was performed by S polarization. Using two bands changing the band intensity in the lengthwise direction and in the direction perpendicular to the lengthwise direction (in the width direction or the radial direction), the band intensity ratio was calculated as an orientation parameter, from the resultant ATR spectra. For example, in the case of a hollow fiber membrane of cellulose acetate propionate, the intensities of bands in the vicinity of 1,062 cm$^{-1}$ (a pyranose ring (—C—O—C—)) and in the vicinity of 1,164 cm$^{-1}$ (a propionyl group (—C—O—)) were each measured in the lengthwise direction and in the radial direction, respectively, of the hollow fiber membrane, and the degree of orientation was determined from the following formula:

Degree of orientation=(the band intensity in the vicinity of 1,062 cm$^{-1}$ in the lengthwise direction/the band intensity in the vicinity of 1,164 cm$^{-1}$ in the lengthwise direction)/(the band intensity in the vicinity of 1,062 cm$^{-1}$ in the radial direction/the band intensity in the vicinity of 1,164 cm$^{-1}$ in the radial direction)

(13) Positron Annihilation Life Measurement Method by Positron Beam Method

Measurement was made using a positron beam method. A separation membrane was dried under reduced pressure at room temperature to prepare a testing sample. The testing sample was measured by a thin film corresponding positron annihilation lifetime measurement apparatus equipped with a positron beam generator (this apparatus is described in detail, for example, in Radiation Physics and Chemistry, vol. 58, p. 603, Pergamon Press (2000)), at a beam intensity of 3 keV in vacuum at room temperature, at a total count number of 5,000,000 by a scintillation counter made of barium difluoride using a photomultiplier tube. An analysis is performed by POSITRONFIT to obtain the average lifetime τ of the third component.

[Cellulose Ester (A)]

Cellulose Ester (A1)

To 100 parts by weight of cellulose (cotton linter), 240 parts by weight of acetic acid and 67 parts by weight of propionic acid were added, followed by mixing at 50° C. for 30 minutes. After the mixture was cooled to room temperature, 172 parts by weight of acetic anhydride cooled in an ice bath and 168 parts by weight of propionic anhydride were added as esterifying agents, and 4 parts by weight of sulfuric acid was added as an esterifying catalyst, followed by stirring for 150 minutes to conduct an esterification reaction. When the temperature exceeded 40° C. in the esterification reaction, cooling was performed in a water bath.

After the reaction, a mixed solution of 100 parts by weight of acetic acid and 33 parts by weight of water was added as a reaction terminator for 20 minutes to hydrolyze excessive anhydrides. Thereafter, 333 parts by weight of acetic acid and 100 parts by weight of water were added, followed by heating and stirring at 80° C. for 1 hour. After the completion of the reaction, an aqueous solution containing 6 parts by weight of sodium carbonate was added. Cellulose acetate propionate precipitated was separated by filtration, subsequently washed with water, and thereafter dried at 60° C. for 4 hours. The average degrees of substitution of acetyl groups and propionyl groups were 1.9 and 0.7, respectively, and the weight average molecular weight (Mw) thereof was 178, 000.

Cellulose Ester (A2)

In 500 ml of deionized water, 50 g of cellulose (dissolving pulp manufactured by Nippon Paper Industries Co., Ltd.) was immersed, and allowed to stand for 10 minutes. This was separated by a glass filter, drained, dispersed in 700 ml of acetic acid, sometimes mixed by shaking, and allowed to stand for 10 minutes. Subsequently, the same operation was repeated again using new acetic acid. In a flask, 900 g of acetic acid and 0.9 g of concentrated sulfuric acid were put, and stirred. Thereto, 180 g of acetic anhydride was added, followed by stirring for 60 minutes while cooling in a water bath so that the temperature did not exceed 40° C. After the completion of the reaction, an aqueous solution containing 2 g of sodium carbonate was added. The cellulose ester precipitated was separated by filtration, subsequently washed with water, and thereafter dried at 60° C. for 4 hours. The amount of cellulose acetate obtained was 85.3 g, and the average degree of substitution of cellulose acetate was 2.9.

Cellulose Ester (A3)

Cellulose acetate (LT35) manufactured by Daicel Corporation, the degree of substitution: 2.90

Cellulose Ester (A4)

Cellulose diacetate (L30) manufactured by Daicel Corporation, the degree of substitution: 2.45

[Plasticizer (B)]

Plasticizer (B1)

Polyethylene glycol, weight average molecular weight: 600

Plasticizer (B2)

Polyethylene glycol, weight average molecular weight: 1,000

Plasticizer (B3)

Glycerin

Plasticizer (B4)

Glycerin diacetomonostearate

Plasticizer (B5)

Glycerin diacetomonooleate

[High-Molecular-Weight Polyalkylene Glycol (C)]

High-molecular-weight polyalkylene glycol (C1)

Polyethylene glycol, number average molecular weight: 8,300

High-molecular-weight polyalkylene glycol (C2)

Polyethylene glycol, number average molecular weight: 100,000

High-molecular-weight polyalkylene glycol (C3)

Polyethylene glycol, number average molecular weight: 4,000

High-molecular-weight polyalkylene glycol (C4)

Polyethylene glycol, number average molecular weight: 20,000

[Antioxidant (D)]

Antioxidant (D1)

Bis(2,6-di-t-butyl-4-methylphenyl)pentaerythritol diphosphite

[Production of Separation Membrane]

Example 1

The plasticizer (B1) (25.9% by weight) and 0.1% by weight of the antioxidant (D1) were melt-kneaded with 74% by weight of the cellulose ester (A1) in a twin-screw extruder at 240° C., homogenized and thereafter pelletized to obtain a resin composition for melt spinning. The pellets were dried in vacuum at 80° C. for 8 hours. The crystal melting temperature of this resin composition was 220° C.

The dried pellets were fed to a twin-screw extruder, melted at 230° C., introduced into a melt spinning pack adjusted to 230° C. in spinning temperature, and spun downwards under conditions of a discharge rate of 60 g/min from a spinneret having 72 spinneret holes (a type of forming one discharge hole by arranging 3 arcuate slit parts, discharge hole radius: 0.60 mm, pitch between slits: 0.10 mm, slit width: 0.08 mm). The spun hollow fibers were introduced into a cooling apparatus (chimney) (length: 1 m) so that the distance L from a lower surface of the spinneret to an upper end of the cooling apparatus was 30 mm, cooled by cooling air of 25° C. and an air velocity of 1.5 m/sec, subjected to application of an oiling agent, bundled, and thereafter wound by a winder at a draft ratio of 400, followed by immersion in a 10 wt % aqueous solution of isopropyl alcohol for 1 hour. The physical properties of the resultant separation membrane (hollow fiber membrane) are shown in Table 1.

In the separation membrane of this Example, from a change in weight before and after the immersion in the 10 wt % aqueous solution of isopropyl alcohol for 1 hour, it was confirmed that the whole amount of polyethylene glycol added as the plasticizer in melt spinning was eluted from the inside of the separation membrane into water. In addition, the resultant separation membrane was homogeneous in structure of a cross-section.

Examples 2 to 7 and Comparative Example 1

Separation membranes were obtained in the same manner as in Example 1, except that the composition of the resin composition for melt spinning and the production conditions were each changed as shown in Table 1. The physical properties of the resultant separation membranes are shown in Table 1.

In the separation membranes of Examples 2 to 7, from a change in weight before and after the immersion in the 10 wt % aqueous solution of isopropyl alcohol for 1 hour, it was confirmed that the whole amount of polyethylene glycol added as the plasticizer in melt spinning was eluted from the insides of the separation membranes into water. In addition, the resultant separation membranes were homogeneous in structure of cross-sections.

Further, in Comparative Example 1, flowability was poor because of excessively high melt viscosity, so that thinning of spun yarns did not occur, resulting in a failure of winding due to yarn breakage.

Comparative Example 2

The cellulose ester (A3) (41% by weight), 49.9% by weight of N-methyl-2-pyrrolidone, 8.8% by weight of ethylene glycol and 0.3% by weight of benzoic acid were melted at 180° C. The resultant solution was defoamed under reduced pressure, thereafter spun downwards from spinneret holes (a type of forming one discharge hole by arranging 3 arcuate slit parts) at 160° C., and solidified in a bath of 12° C. composed of N-methyl-2-pyrrolidone/ethylene glycol/water=4.25% by weight/0.75% by weight/95% by weight, after an elapse of a time of exposure to air of 0.03 seconds, followed by washing in water. Then, heat treatment was performed in water of 60° C. for 40 minutes to obtain a hollow fiber membrane having an outer diameter of 167 μm and a percentage of hollowness of 25%.

The crystal melting heat amount (ΔHm) of the resultant hollow fiber membrane was 8 J/g, the degree of orientation was 1.14. Further, the membrane permeation flux was 87 L/m$^2$/day, the salt rejection was 97.2%, the tensile elasticity was 1,435 MPa, and the tensile strength was 72 MPa. In addition, the resultant separation membrane was non-homogeneous in structure of a cross-section.

forming one discharge hole by arranging 3 arcuate slit parts, discharge hole radius: 0.60 mm, pitch between slits: 0.10 mm, slit width: 0.08 mm). The spun hollow fibers were introduced into a cooling apparatus (chimney) (length: 1 m) so that the distance L from a lower surface of the spinneret to an upper end of the cooling apparatus was 30 mm, cooled by cooling air of 25° C. and an air velocity of 1.5 m/sec, subjected to application of an oiling agent, bundled, and thereafter wound by a winder at a draft ratio of 200, followed by immersion in a 10 wt % aqueous solution of isopropyl alcohol for 1 hour. The physical properties of the resultant separation membrane (hollow fiber membrane) are shown in Table 2.

In the separation membrane of this Example, from a change in weight before and after the immersion in the 10 wt % aqueous solution of isopropyl alcohol for 1 hour, it was confirmed that the whole amount of polyethylene glycol added as the plasticizer in melt spinning was eluted from the inside of the separation membrane into water. In addition, the resultant separation membrane was homogeneous in structure of a cross-section.

TABLE 1

| | | | Example 1 | Example 2 | Example 3 | Example 4 | Example 5 | Example 6 | Example 7 | Comparative Example 1 |
|---|---|---|---|---|---|---|---|---|---|---|
| Resin Composition for Melt Spinning | Cellulose Ester (A) | Type | A1 | A1 | A1 | A1 | A1 | A1 | A1 | A2 |
| | | wt % | 74 | 82 | 82 | 82 | 82 | 82 | 84 | 82 |
| | Plasticizer (B) | Type | B1 | B1 | B1 | B1 | B1 | B1 | B1 | B1 |
| | | wt % | 25.9 | 17.9 | 17.9 | 17.9 | 17.9 | 17.9 | 15.9 | 17.9 |
| | Antioxidant (D) | Type | D1 | D1 | D1 | D1 | D1 | D1 | D1 | D1 |
| | | wt % | 0.1 | 0.1 | 0.1 | 0.1 | 0.1 | 0.1 | 0.1 | 0.1 |
| | Crystal Melting Temperature | ° C. | 220 | 225 | 225 | 225 | 225 | 225 | 227 | 230 |
| Production Conditions | Spinning Temperature | ° C. | 230 | 235 | 260 | 235 | 235 | 235 | 270 | 260 |
| | Distance L | mm | 30 | 30 | 30 | 70 | 30 | 30 | 150 | 30 |
| | Cooling Air Velocity | m/sec | 1.5 | 1.5 | 1.5 | 1.5 | 0.7 | 1.5 | 0.3 | 1.5 |
| | Draft Ratio | — | 400 | 400 | 400 | 400 | 400 | 150 | 400 | 400 |
| Structure and Physical Properties of Membrane | Outer Diameter | μm | 51 | 53 | 39 | 43 | 46 | 116 | 53 | Impossible to wind |
| | Percentage of Hollowness | % | 37 | 39 | 29 | 29 | 32 | 32 | 39 | |
| | ΔHm | J/g | 9 | 10 | 4 | 5 | 8 | 7 | 1 | |
| | Degree of Orientation | — | 1.31 | 1.48 | 1.12 | 1.19 | 1.32 | 1.06 | 1.05 | |
| | Membrane Permeation Flux | L/m$^2$/day | 2.5 | 1.0 | 1.3 | 1.2 | 1.1 | 0.5 | 1.0 | |
| | Salt Rejection | % | 93.0 | 98.7 | 90.3 | 93.8 | 96.3 | 91.1 | 88.5 | |
| | Tensile Elasticity | MPa | 1,586 | 3,081 | 2,633 | 2,690 | 2,829 | 2,752 | 2,340 | |
| | Tensile Strength | MPa | 102 | 153 | 121 | 124 | 140 | 130 | 98 | |

Example 8

The plasticizer (B1) (15.9% by weight), 2.0% by weight of the high-molecular-weight polyalkylene glycol (C1) and 0.1% by weight of the antioxidant (D1) were melt-kneaded with 82% by weight of the cellulose ester (A1) in a twin-screw extruder at 240° C., homogenized and thereafter pelletized to obtain a resin composition for melt spinning. The pellets were dried in vacuum at 80° C. for 8 hours. The crystal melting temperature of this resin composition was 210° C.

The dried pellets were fed to a twin-screw extruder, melted at 235° C., introduced into a melt spinning pack adjusted to 235° C. in spinning temperature, and spun downwards under conditions of a discharge rate of 60 g/min from a spinneret having 72 spinneret holes (a type of

Examples 9 to 16

Separation membranes were obtained in the same manner as in Example 8, except that the composition of the resin composition for melt spinning and the production conditions were each changed as shown in Table 2. The physical properties of the resultant separation membranes are shown in Table 2. In the separation membranes of Examples 9 to 16, from a change in weight before and after the immersion in the 10 wt % aqueous solution of isopropyl alcohol for 1 hour, it was confirmed that the whole amount of polyethylene glycol added as the plasticizer in melt spinning was eluted from the insides of the separation membranes into water. In addition, the resultant separation membranes were homogeneous in structure of cross-sections.

TABLE 2

| | | | Example 8 | Example 9 | Example 10 | Example 11 | Example 12 | Example 13 | Example 14 | Example 15 | Example 16 |
|---|---|---|---|---|---|---|---|---|---|---|---|
| Resin Composition for Melt Spinning | Cellulose Ester (A) | Type | A1 | A1 | A1 | A1 | A1 | A1 | A1 | A1 | A1 |
| | | wt % | 82 | 82 | 82 | 82 | 82 | 82 | 82 | 82 | 82 |
| | Plasticizer (B) | Type | B1 | B1 | B1 | B1 | B1 | B1 | B1 | B1 | B1 |
| | | wt % | 15.9 | 15.9 | 15.9 | 13.9 | 13.9 | 13.9 | 15.9 | 15.9 | 15.9 |
| | High-Molecular-Weight Polyalkylene Glycol (C) | Type | C1 | C1 | C1 | C1 | C1 | C1 | C2 | C2 | C2 |
| | | wt % | 2.0 | 2.0 | 2.0 | 4.0 | 4.0 | 4.0 | 2.0 | 2.0 | 2.0 |
| | Antioxidant (D) | Type | D1 | D1 | D1 | D1 | D1 | D1 | D1 | D1 | D1 |
| | | wt % | 0.1 | 0.1 | 0.1 | 0.1 | 0.1 | 0.1 | 0.1 | 0.1 | 0.1 |
| | Crystal Melting Temperature | °C. | 210 | 210 | 210 | 205 | 205 | 205 | 210 | 210 | 210 |
| Production Conditions | Spinning Temperature | °C. | 235 | 235 | 235 | 235 | 235 | 235 | 235 | 235 | 235 |
| | Distance L | mm | 30 | 30 | 30 | 30 | 30 | 30 | 30 | 30 | 30 |
| | Cooling Air Velocity | m/sec | 1.5 | 1.5 | 1.5 | 1.5 | 1.5 | 1.5 | 1.5 | 1.5 | 1.5 |
| | Draft Ratio | — | 200 | 400 | 750 | 200 | 400 | 750 | 200 | 400 | 750 |
| Structure and Physical Properties of Membrane | Outer Diameter | μm | 48 | 36 | 28 | 50 | 38 | 28 | 47 | 36 | 28 |
| | Percentage of Hollowness | % | 22 | 27 | 28 | 36 | 31 | 37 | 33 | 30 | 37 |
| | ΔHm | J/g | 7 | 8 | 10 | 5 | 6 | 7 | 4 | 5 | 7 |
| | Degree of Orientation | — | 1.18 | 1.55 | 2.06 | 1.27 | 1.71 | 2.20 | 1.31 | 1.85 | 2.28 |
| | Membrane Permeation Flux | L/m²/day | 3.2 | 7.6 | 5.1 | 6.4 | 7.9 | 12.6 | 4.1 | 3.2 | 3.3 |
| | Salt Rejection | % | 54.7 | 58.8 | 90.5 | 52.2 | 57.0 | 94.1 | 56.9 | 83.0 | 94.2 |
| | Tensile Elasticity | MPa | 2,387 | 2,654 | 2,853 | 1,892 | 2,216 | 2,534 | 2,549 | 2,711 | 3,013 |
| | Tensile Strength | MPa | 102 | 107 | 118 | 90 | 94 | 100 | 108 | 115 | 124 |

Example 17

The plasticizer (B1) (17.9% by weight) and 0.1% by weight of the antioxidant (D1) were melt-kneaded with 82% by weight of the cellulose ester (A1) in a twin-screw extruder at 240° C., homogenized and thereafter pelletized to obtain pellets for melt spinning. The pellets were dried in vacuum at 80° C. for 8 hours. The crystal melting temperature of the pellets was 225° C.

The dried pellets were fed to a twin-screw extruder, and melted at 230° C. The melt was introduced into a melt spinning pack adjusted to 235° C. in spinning temperature, and spun from a spinneret at a speed of 3.0 m/min. The spinneret had 72 discharge holes. One discharge hole was formed by 3 arcuate slit parts, the discharge hole radius was 0.60 mm, the pitch between the slits was 0.10 mm, and the slit width was 0.08 mm.

The distance L from a lower surface of the spinneret to an upper end of a cooling apparatus (chimney, length: 1 m) was adjusted to 30 mm.

The melt introduced into the cooling apparatus was cooled by cooling air of 25° C. and an air velocity of 1.5 m/sec, subjected to application of an oiling agent, bundled, and thereafter wound by a winder at a speed of 1,200 m/min to a draft ratio of 400, thereby obtaining hollow fibers.

The physical properties of the separation membrane (hollow fiber membrane) obtained by immersing this hollow fiber in water for 1 hour are shown in Table 3. In the hollow fiber membrane of this Example, from a change in weight between the hollow fiber and the hollow fiber membrane, it was confirmed that the whole amount of polyethylene glycol added as the plasticizer was eluted. In addition, the resultant separation membrane was homogeneous in structure of a cross-section.

Examples 18 to 22

Separation membranes (hollow fiber membranes) were obtained in the same manner as in Example 17, except that the composition of the resin composition for melt spinning and the production conditions were each changed as shown in Table 3. The physical properties of the resultant separation membranes are shown in Table 3. In the separation membranes of Examples 18 to 22, from a change in weight before and after the immersion in water for 1 hour, it was confirmed that the whole amount of polyethylene glycol added as the plasticizer in melt spinning was eluted. In addition, the resultant separation membranes were homogeneous in structure of cross-sections.

Example 23

The plasticizer (B1) (17.9% by weight), 4% by weight of the high-molecular-weight polyalkylene glycol (C1) and 0.1% by weight of the antioxidant (D1) were melt-kneaded with 78% by weight of the cellulose ester (A1) in a twin-screw extruder at 240° C., homogenized and thereafter pelletized to obtain pellets for melt spinning. The pellets were dried in vacuum at 80° C. for 8 hours. The crystal melting temperature of the pellets was 203° C.

Using the dried pellets, a separation membrane (hollow fiber membrane) was obtained in the same manner as in Example 17. The physical properties of the resultant separation membrane (hollow fiber membrane) are shown in Table 4. In the hollow fiber membrane of this Example, from a change in weight between the hollow fiber and the hollow fiber membrane, it was confirmed that the whole amount of polyethylene glycol added as the plasticizer was eluted. In addition, the resultant separation membrane was homogeneous in structure of a cross-section.

Examples 24 to 27 and Comparative Examples 3 to 5

Separation membranes (hollow fiber membranes) were obtained in the same manner as in Example 23, except that the composition of the resin composition for melt spinning and the production conditions were each changed as shown in Table 4. The physical properties of the resultant separation membranes are shown in Table 4. In the separation membranes of Examples 24 to 27 and Comparative Examples 3 to 5, from a change in weight before and after the immersion in water for 1 hour, it was confirmed that the whole amount of polyethylene glycol added as the plasticizer in melt spinning was eluted. In addition, the resultant separation membranes were homogeneous in structure of cross-sections.

Example 28

The plasticizer (B1) (25.9% by weight) and 0.1% by weight of the antioxidant (D1) were melt-kneaded with 74% by weight of the cellulose ester (A1) in a twin-screw extruder at 240° C., homogenized and thereafter pelletized to obtain a resin composition for melt spinning. The pellets were dried in vacuum at 80° C. for 8 hours. The crystal melting temperature of this resin composition was 220° C.

The dried pellets were fed to a twin-screw extruder, melted at 230° C., introduced into a melt spinning pack

TABLE 3

| | | | Example 17 | Example 18 | Example 19 | Example 20 | Example 21 | Example 22 |
|---|---|---|---|---|---|---|---|---|
| Resin Composition for Melt Spinning | Cellulose Ester (A) | Type | A1 | A1 | A1 | A1 | A1 | A1 |
| | | wt % | 82 | 82 | 82 | 74 | 70 | 70 |
| | Plasticizer (B) | Type | B1 | B1 | B1 | B1 | B1 | B1 |
| | | wt % | 17.9 | 17.9 | 17.9 | 25.9 | 29.9 | 29.9 |
| | Antioxidant (D) | Type | D1 | D1 | D1 | D1 | D1 | D1 |
| | | wt % | 0.1 | 0.1 | 0.1 | 0.1 | 0.1 | 0.1 |
| | Crystal Melting Temperature | ° C. | 225 | 225 | 225 | 220 | 218 | 218 |
| Production Conditions | Spinning Temperature | ° C. | 235 | 235 | 235 | 235 | 235 | 235 |
| | Discharge Rate | m/min | 3.0 | 3.0 | 2.7 | 3.0 | 3.0 | 2.7 |
| | Distance L | mm | 30 | 30 | 30 | 30 | 30 | 30 |
| | Cooling Air Velocity | m/sec | 1.5 | 1.5 | 1.5 | 1.5 | 1.5 | 1.5 |
| | Winding Rate | m/min | 1,200 | 600 | 2,000 | 1,200 | 1,200 | 2,000 |
| | Draft Ratio | — | 400 | 200 | 740 | 400 | 400 | 740 |
| Structure and Physical Properties of Membrane | Outer Diameter | μm | 36 | 52 | 25 | 44 | 33 | 22 |
| | Percentage of Hollowness | % | 35 | 35 | 37 | 34 | 35 | 36 |
| | ΔHm | J/g | 10 | 8 | 13 | 10 | 7 | 8 |
| | Degree of Orientation | — | 1.41 | 1.05 | 1.98 | 1.37 | 1.34 | 1.89 |
| | Positron Annihilation Life | ns | 2.22 | 2.21 | 2.25 | 2.23 | 2.24 | 2.26 |
| | Membrane Permeation Flux | L/m²/day | 1.5 | 1.2 | 2.3 | 1.7 | 2.2 | 2.9 |
| | Salt Rejection | % | 97 | 95 | 88 | 94 | 90 | 82 |
| | Tensile Elasticity | MPa | 2,952 | 2,780 | 3,252 | 1,590 | 1,508 | 1,814 |
| | Tensile Strength | MPa | 147 | 136 | 161 | 104 | 91 | 109 |

TABLE 4

| | | | Example 23 | Example 24 | Example 25 | Example 26 | Example 27 | Comparative Example 3 | Comparative Example 4 | Comparative Example 5 |
|---|---|---|---|---|---|---|---|---|---|---|
| Resin Composition for Melt Spinning | Cellulose Ester (A) | Type | A1 | A1 | A1 | A1 | A1 | A1 | A1 | A3 |
| | | wt % | 78 | 78 | 76 | 78 | 78 | 78 | 82 | 78 |
| | Plasticizer (B) | Type | B1 | B1 | B1 | B2 | B2 | B1 | B1 | B1 + B3 |
| | | wt % | 17.9 | 17.9 | 17.9 | 17.9 | 17.9 | 17.9 | 17.9 | 17.9 + 4 |
| | High-Molecular-Weight Polyalkylene Glycol (C) | Type | C1 | C1 | C3 | C1 | C4 | C1 | — | — |
| | | wt % | 4 | 4 | 6 | 4 | 4 | 4 | 0 | 0 |
| | Antioxidant (D) | Type | D1 | D1 | D1 | D1 | D1 | D1 | D1 | D1 |
| | | wt % | 0.1 | 0.1 | 0.1 | 0.1 | 0.1 | 0.1 | 0.1 | 0.1 |
| | Crystal Melting Temperature | ° C. | 203 | 203 | 201 | 204 | 204 | 203 | 225 | 199 |
| Production Conditions | Spinning Temperature | ° C. | 235 | 235 | 235 | 235 | 235 | 235 | 235 | 215 |
| | Discharge Rate | m/min | 3.0 | 2.7 | 2.7 | 2.7 | 2.7 | 2.7 | 2.7 | 2.7 |
| | Distance L | mm | 30 | 30 | 30 | 30 | 30 | 30 | 30 | 30 |
| | Cooling Air Velocity | m/sec | 1.5 | 1.5 | 1.5 | 1.5 | 1.5 | 1.5 | 1.5 | 1.5 |
| | Winding Rate | m/min | 1,200 | 2,000 | 2,000 | 2,000 | 2,000 | 55 | 55 | 55 |
| | Draft Ratio | — | 400 | 740 | 740 | 740 | 740 | 20 | 20 | 20 |
| Structure and Physical Properties of Membrane | Outer Diameter | μm | 32 | 26 | 27 | 27 | 28 | 193 | 226 | 206 |
| | Percentage of Hollowness | % | 32 | 33 | 31 | 33 | 32 | 33 | 35 | 32 |
| | ΔHm | J/g | 5 | 9 | 9 | 9 | 9 | 3 | 4 | 3 |
| | Degree of Orientation | — | 1.65 | 2.21 | 2.16 | 1.83 | 1.77 | 1.03 | 1.02 | 1.02 |
| | Positron Annihilation Life | ns | 2.51 | 2.32 | 2.34 | 2.33 | 2.34 | 2.82 | 2.29 | 2.88 |
| | Membrane Permeation Flux | L/m²/day | 6.4 | 5.7 | 6.0 | 5.9 | 6.3 | 2.3 | 0.2 | 5.2 |
| | Salt Rejection | % | 52 | 96 | 90 | 92 | 87 | 78 | 84 | 39 |
| | Tensile Elasticity | MPa | 2,151 | 2,388 | 2,315 | 2,420 | 2,483 | 1,372 | 1,410 | 972 |
| | Tensile Strength | MPa | 92 | 97 | 95 | 102 | 105 | 47 | 78 | 37 | adjusted to 230° C. in spinning temperature, and spun downwards under conditions of a discharge rate of 26 g/min from a spinneret having 4 spinneret holes (a type of forming one discharge hole by arranging 3 arcuate slit parts, discharge hole radius: 2.30 mm, pitch between slits: 0.10 mm, slit width: 0.45 mm). The spun hollow fibers were introduced into a cooling apparatus (chimney) (length: 1 m) so that the distance L from a lower surface of the spinneret to an upper end of the cooling apparatus was 30 mm, cooled by cooling air of 25° C. and an air velocity of 1.5 m/sec, subjected to application of an oiling agent, bundled, and thereafter wound by a winder at a draft ratio of 400, followed by immersion in a 10 wt % aqueous solution of isopropyl alcohol for 1 hour. The physical properties of the resultant separation membrane (hollow fiber membrane) are shown in Table 5.

In the separation membrane of this Example, from a change in weight before and after the immersion in the 10 wt % aqueous solution of isopropyl alcohol for 1 hour, it was confirmed that the whole amount of polyethylene glycol added as the plasticizer in melt spinning was eluted from the inside of the separation membrane into water. In addition, the resultant separation membrane was homogeneous in structure of a cross-section.

Examples 29 to 34 and Comparative Example 6

Separation membranes (hollow fiber membranes) were obtained in the same manner as in Example 28, except that the composition of the resin composition for melt spinning and the production conditions were each changed as shown in Table 5. The physical properties of the resultant separation membranes are shown in Table 5. In the separation membranes of Examples 29 to 34 and Comparative Example 6, from a change in weight before and after the immersion in water for 1 hour, it was confirmed that the whole amount of polyethylene glycol added as the plasticizer in melt spinning was eluted. In addition, the resultant separation membranes were homogeneous in structure of cross-sections.

performance, having high membrane strength and mainly including a cellulose-based resin. The separation membrane of the present invention can be used for water treatment membranes for producing industrial water, drinking water and the like from seawater, brackish water, sewage water, waste water and the like, medical membranes for artificial kidneys, plasma separation and the like, membranes for food-beverage industry such as fruit juice concentration, gas separation membranes for separating exhaust gas, carbonic acid gas and the like, membranes for electronic industry such as fuel cell separators, and the like. The above-mentioned water treatment membrane can be preferably used for microfiltration membranes, ultrafiltration membranes, nanofiltration membranes, reverse osmosis membranes, forward osmosis membranes and the like.

The present invention has been described in detail using the specified embodiments. It will, however, be apparent to one skilled in the art that various changes and modifications can be made without departing from the spirit and scope of the invention. The present application is based on Japanese Patent Application No. 2014-200263 filed on Sep. 30, 2014, Japanese Patent Application No. 2014-201250 filed on Sep. 30, 2014 and Japanese Patent Application No. 2014-241229 filed on Nov. 28, 2014, the entire contents of which are incorporated herein by reference.

The invention claimed is:

1. A reverse osmosis membrane consisting essentially of a cellulose ester, having a tensile elasticity of 1,500 to 6,500 MPa and a salt rejection of 90.0% or more, having a degree of orientation of 1.30 to 2.50 in a lengthwise direction of the reverse osmosis membrane, and having a crystal melting heat amount ($\Delta Hm$) of 6 to 10 J/g in a temperature rise measurement with a differential scanning calorimeter (DSC).

2. The reverse osmosis membrane according to claim 1, having a shape of a hollow fiber and having a tensile elasticity in a lengthwise direction of 1,500 to 6,500 MPa.

3. The reverse osmosis membrane according to claim 2, wherein the hollow fiber has an outer diameter of 20 to 200 µm.

TABLE 5

| | | | Example 28 | Example 29 | Example 30 | Example 31 | Example 32 | Example 33 | Example 34 | Comparative Example 6 |
|---|---|---|---|---|---|---|---|---|---|---|
| Resin Composition for Melt Spinning | Cellulose Ester (A) | Type | A1 | A1 | A1 | A1 | A1 | A1 | A1 | A1 |
| | | wt % | 74 | 74 | 74 | 82 | 82 | 82 | 82 | 74 |
| | Plasticizer (B) | Type | B1 | B1 | B1 | B1 + B4 | B1 + B4 | B1 + B5 | B1 + B3 | B1 |
| | | wt % | 25.9 | 25.9 | 25.9 | 7.9 + 10 | 7.9 + 10 | 7.9 + 10 | 7.9 + 10 | 25.9 |
| | Antioxidant (D) | Type | D1 | D1 | D1 | D1 | D1 | D1 | D1 | D1 |
| | | wt % | 0.1 | 0.1 | 0.1 | 0.1 | 0.1 | 0.1 | 0.1 | 0.1 |
| | Crystal Melting Temperature | ° C. | 220 | 220 | 220 | 222 | 222 | 222 | 220 | 220 |
| Production Conditions | Spinning Temperature | ° C. | 230 | 230 | 230 | 230 | 230 | 230 | 230 | 230 |
| | Distance L | mm | 30 | 30 | 30 | 30 | 30 | 30 | 30 | 30 |
| | Cooling Air Velocity | m/sec | 1.5 | 1.5 | 1.5 | 1.5 | 1.5 | 1.5 | 1.5 | 1.5 |
| | Draft Ratio | — | 400 | 740 | 200 | 400 | 300 | 400 | 400 | 120 |
| Structure and Physical Properties of Membrane | Outer Diameter | µm | 135 | 78 | 190 | 123 | 161 | 128 | 118 | 222 |
| | Percentage of Hollowness | % | 32 | 29 | 34 | 31 | 31 | 32 | 30 | 32 |
| | $\Delta Hm$ | J/g | 8 | 10 | 7 | 7 | 6 | 7 | 5 | 2 |
| | Degree of Orientation | — | 1.30 | 1.72 | 1.19 | 1.24 | 1.21 | 1.25 | 1.11 | 1.04 |
| | Membrane Permeation Flux | L/m²/day | 1.3 | 1.4 | 1.1 | 1.6 | 1.5 | 1.7 | 1.9 | 0.8 |
| | Salt Rejection | % | 93.8 | 96.2 | 91.5 | 90.3 | 91.0 | 91.0 | 87.8 | 85.2 |
| | Tensile Elasticity | MPa | 1,607 | 2,005 | 1,513 | 1,577 | 1,542 | 1,583 | 1,544 | 1,418 |
| | Tensile Strength | MPa | 112 | 130 | 100 | 108 | 102 | 110 | 98 | 72 |

The present invention provides a separation membrane having excellent separation performance and permeation 4. The reverse osmosis membrane according to claim 1, having a positron annihilation life of 2.2 to 3.0 ns.

5. The reverse osmosis membrane according to claim 1, wherein the cellulose ester is at least one of cellulose acetate propionate and cellulose acetate butyrate.

\* \* \* \* \*